United States Patent [19]
Frederick et al.

[11] Patent Number: 5,737,278
[45] Date of Patent: Apr. 7, 1998

[54] EXTENDED, FLEXIBLE, SPATIALLY WEIGHTED FIBER OPTIC INTERFEROMETRIC HYDROPHONE

[75] Inventors: Donald A. Frederick; Robert P. Goldman, both of Woodland Hills; Steven J. Maas, Simi Valley; John E. Mansell, Thousand Oaks, all of Calif.

[73] Assignee: Litton Systems, Inc., Woodlands Hills, Calif.

[21] Appl. No.: 664,871

[22] Filed: Jun. 17, 1996

[51] Int. Cl.$^6$ .................................................. H04R 23/00
[52] U.S. Cl. .................. 367/149; 356/345; 356/358; 250/227.14
[58] Field of Search .................. 367/149; 356/345, 356/358; 250/227.14, 227.16, 227.24

[56] References Cited

U.S. PATENT DOCUMENTS

| | | | |
|---|---|---|---|
| 4,632,551 | 12/1986 | Pavlath | 356/345 |
| 4,789,241 | 12/1988 | Michal et al. | 356/350 |
| 4,848,906 | 7/1989 | Layton | 356/345 |
| 5,253,222 | 10/1993 | Danver | 367/149 |
| 5,363,342 | 11/1994 | Layton et al. | 367/149 |
| 5,394,377 | 2/1995 | vonBieren | 367/149 |
| 5,475,216 | 12/1995 | Danver et al. | 250/227.1 |
| 5,497,233 | 3/1996 | Meyer | 356/345 |
| 5,504,720 | 4/1996 | Meyer et al. | 367/149 |
| 5,555,086 | 9/1996 | vonBieren et al. | 356/345 |

*Primary Examiner*—J. Woodrow Eldred
*Attorney, Agent, or Firm*—Lynn & Lynn

[57] ABSTRACT

A fiber optic hydrophone is formed as a single interferometer having widely separated interferometer segments formed in each of a pair of optical fibers. The interferometer segments are designed to allow averaging of the effects of local noise sources over a broad area in order to increase the acoustic signal-to-noise ratio. The interferometer segments also allow deployment of the hydrophone around sharp bends. A first optical fiber is formed into a plurality of spatially separated outer coils. A second optical fiber is formed into a plurality of inner coils corresponding to the outer coils. The inner and outer coils are preferably arranged in concentric pairs to form a plurality of sensor segments. A plurality of spacers is arranged such that a spacer is between successive sensor segments. The spacers are formed to guide the outer and inner optical fibers between successive sensor segments such that changes in the physical parameter between the sensor segments produce no phase difference between optical signals guided by the outer and inner fibers. The outer and inner coils are preferably arranged for exposure to the parameter such that changes in the parameter at each sensor segment produce opposite phase changes between the optical signals in the outer coils and the corresponding outer coil.

11 Claims, 4 Drawing Sheets

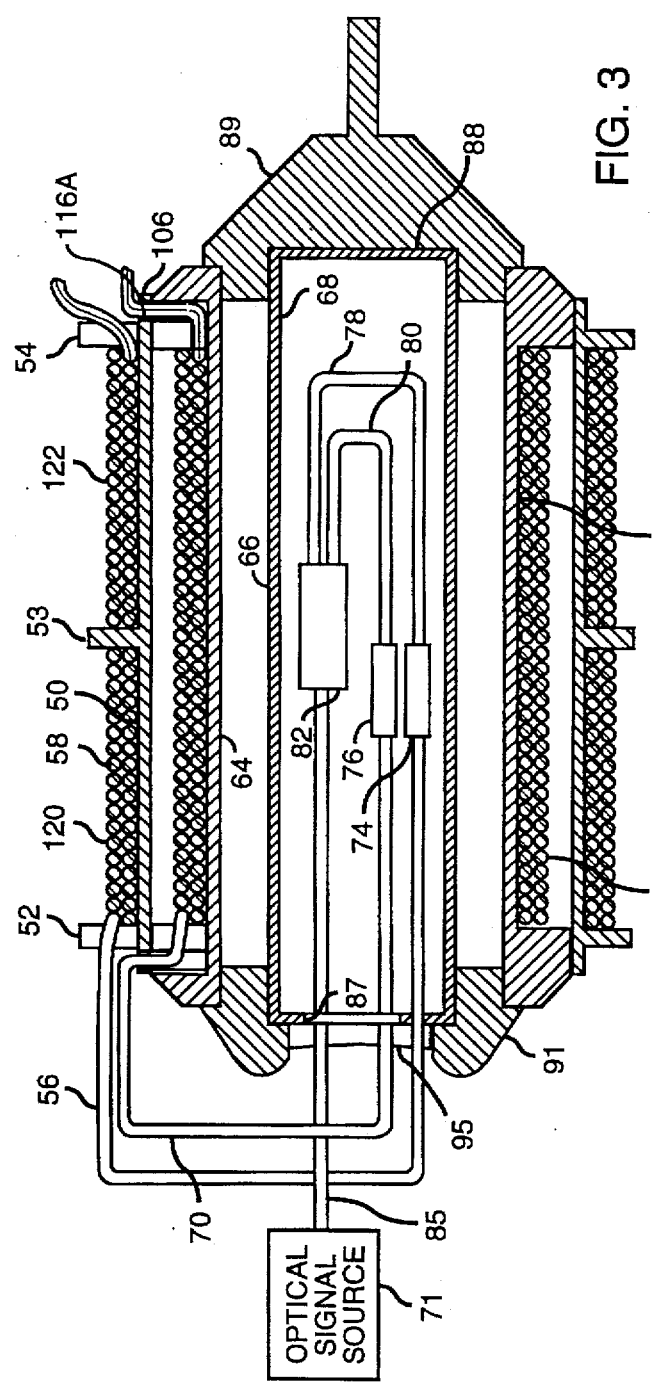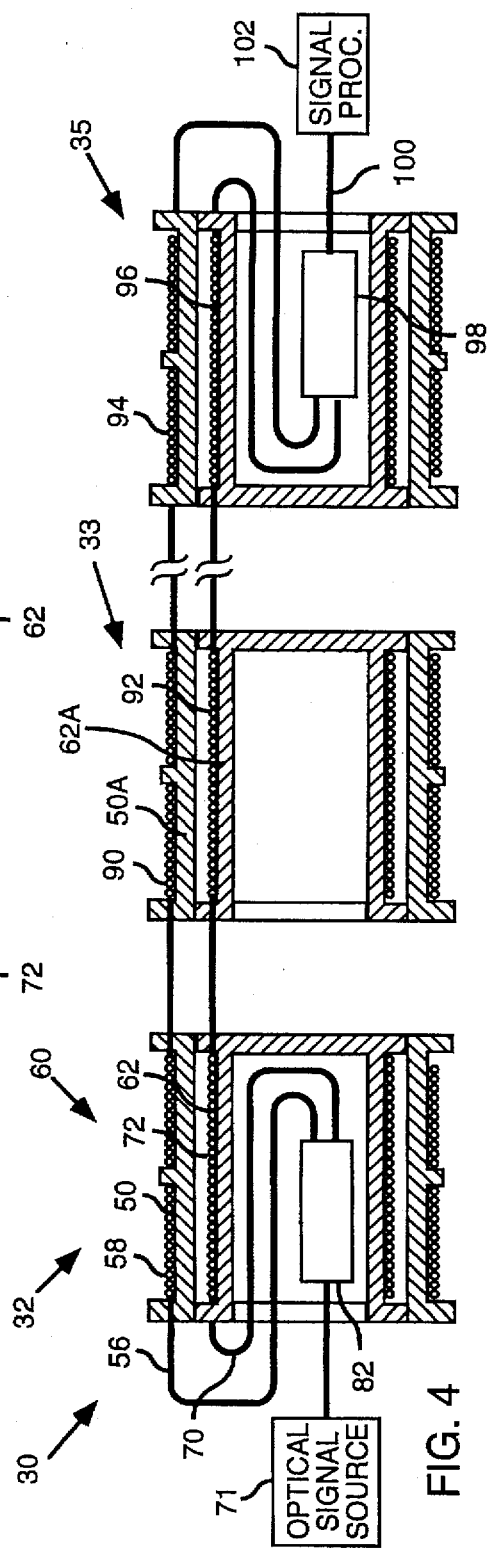

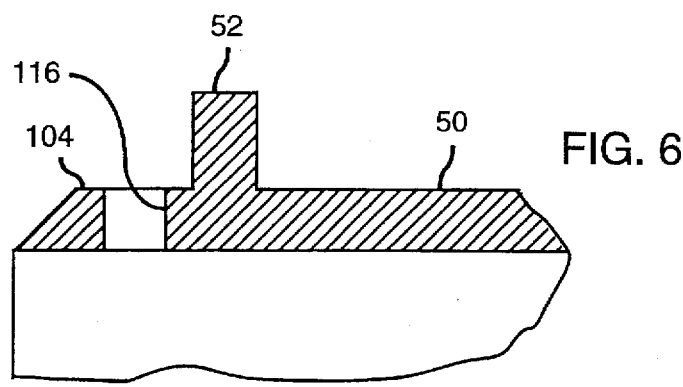
FIG. 6
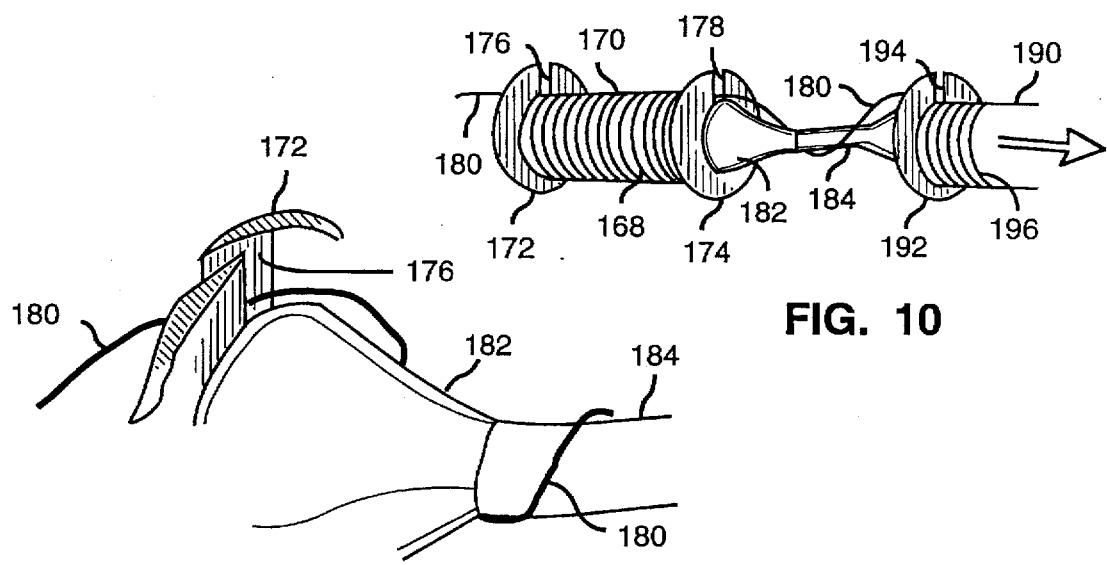
FIG. 10
FIG. 11
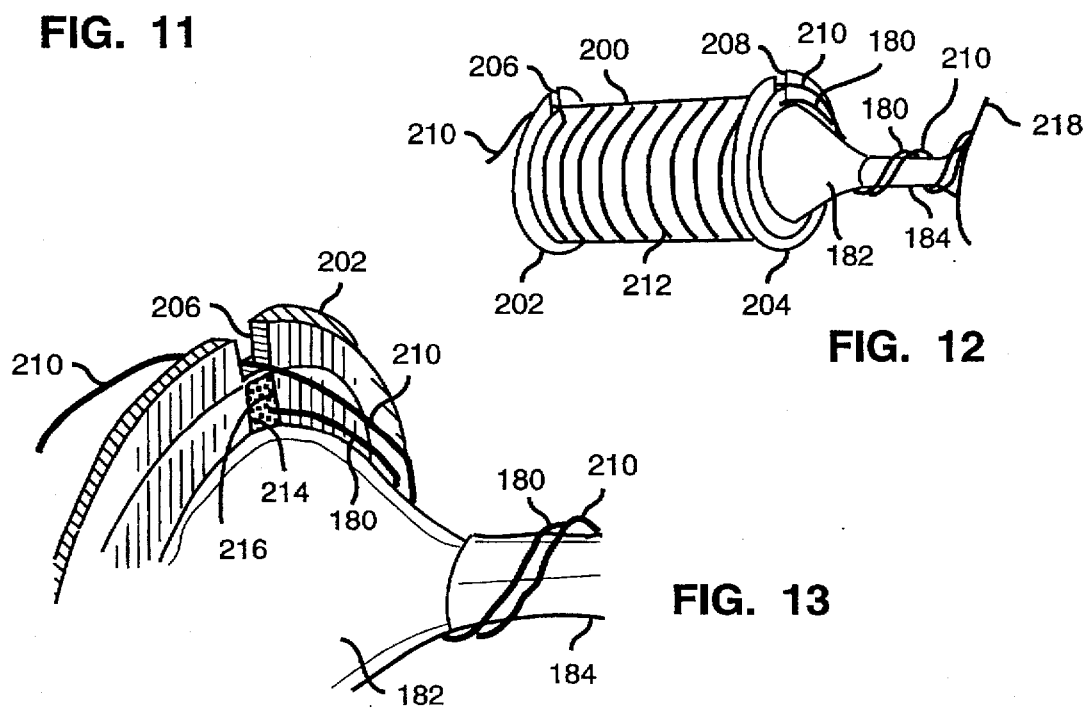
FIG. 12
FIG. 13

EXTENDED, FLEXIBLE, SPATIALLY WEIGHTED FIBER OPTIC INTERFEROMETRIC HYDROPHONE

BACKGROUND OF THE INVENTION

This invention relates generally to acoustic sensors and particularly to hydrophone acoustic sensors. Still more particularly, this invention relates to a fiber optic hydrophone comprising a segmented interferometer spanning over a distance sufficient to allow averaging of the effects of local noise sources and to increase the signal-to-noise ratio.

The prior art addresses the problems of deploying towed fiber optic hydrophones, which previously had been rigid cylinders, inside hoses that were reeled over rather sharp bends.

Previously, acquiring interferometric acoustic data from locations separated by more than a few inches required deployment of a plurality of individual fiber-optic interferometers. This strategy has several unattractive features. A large number of telemetry lines are required to transmit data between the and the receiving station, which increases the cost and size of the sensor. More signal processing is required to receive and condition the signals from the individual interferometers and perform any subsequent averaging and noise reduction operations. Additional expense and complexity are caused by the amount of hardware (i.e., fiber-optic couplers) required to build such sensors.

SUMMARY OF THE INVENTION

This invention provides improvement over prior art fiber optic hydrophones by providing widely spatially separated interferometer segments. Each interferometer segment comprises a coil formed in each of a pair of optical fibers. The interferometer segments are designed to allow averaging of the effects of local noise sources (for example, acceleration, turbulent flow noise) over a broad area in order to increase the acoustic signal-to-noise ratio. The interferometer segments also allow deployment of the hydrophone around sharp bends.

The hydrophone according to the invention comprises a single fiber-optic interferometer. Each interferometer segment comprises a length of optical fiber wound around a flexible mechanical support that determines the shape and acoustic sensitivity of the sensor. The fiber is applied to the mechanical support in a manner designed to provide a specified acoustic sensitivity at specified locations along the sensor, and to minimize interferometric sensitivity to noise sources along the sensor.

A spatially weighted, extended fiber optic sensor according to the invention for measuring changes in a physical parameter, such as acoustic pressure, comprises a first optical fiber formed into a plurality of spatially separated outer coils. A second optical fiber is formed into a plurality of spatially separated inner coils. The outer and inner coils are preferably arranged in concentric pairs to form the plurality of sensor segments. A plurality of spacers is arranged such that a spacer is between successive sensor segments. The spacers are formed to guide the outer and inner optical fibers between successive sensor segments such that changes in the physical parameter between the sensor segments produce no phase difference between optical signals guided by the outer and inner fibers. A first optical coupler provides optical signals into the outer and inner optical fibers. The outer and inner coils are preferably arranged for exposure to the parameter such that changes in the parameter at each sensor segment produce corresponding phase changes between the optical signals in the outer coils and the corresponding outer coil. A second optical coupler combines signals in the outer and inner optical fibers after exposure of the sensor segments to the parameter.

The sensor mechanical support may be a continuous rod of flexible material (for example, nylon, polycarbonate plastic) shaped to provide the desired support and spatial distribution of acoustic sensitivity. The sensor mechanical support may be a chain-like structure in which bending is confined to flexible joints that join rigid sections providing specified acoustic sensitivity.

Acoustic sensitivity is tailored to a certain position on the sensor by controlling the amount of optical fiber wound onto the sensor at that position, and/or by forming the mechanical support for greater or lesser response to an acoustic signal.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 3 is a cross-sectional view showing optical fibers wrapped around inner and outer mandrels that may be included in the hydrophone segments of FIG. 1 and showing formation of an interferometer using the optical fibers;

FIG. 4 is a schematic diagram showing the basic structure of a fiber optic interferometer that may be included in the fiber optic hydrophone according to the invention;

FIG. 6 is a cross section of an enlarged illustration of a portion of an end of the outer mandrel of FIG. 5;

FIG. 10 is a perspective view showing optical fibers routed between successive segments along a spacer;

FIG. 11 is an expanded view of the apparatus of FIG. 10 showing an optical fiber passing through a slot formed in a flange on a mandrel;

FIG. 12 is a perspective view showing an alternative arrangement for routing optical fibers between successive segments; and FIG. 13 is an expanded view of a portion of the apparatus of FIG. 12 showing outer and inner optical fibers passing through slots formed in end flanges formed on a pair of concentric mandrels.

DESCRIPTION OF THE PREFERRED EMBODIMENT

This invention is directed to an extended fiber optic hydrophone that includes a spatially distributed interferometer. The specific embodiments disclosed herein are intended to be exemplary of how the invention may be practiced. The scope of the invention should not be understood to be limited to the specific structures and methods described herein.

Figure 1:
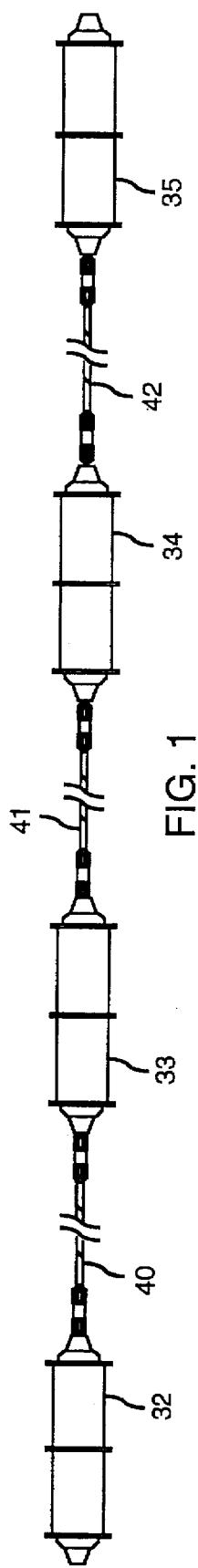
FIG. 1 illustrates a fiber optic hydrophone according to the invention.

As shown in FIG. 1, a fiber optic hydrophone 30 according to the invention includes a plurality of fiber optic hydrophone segments 32–35. The fiber optic hydrophone segments 32–35 preferably are substantially identical. Therefore, any structural feature described for any one of the fiber optic hydrophone segments 32–35 is understood to be included in all of the fiber optic hydrophone segments 32–35.

The fiber optic hydrophone segments 32 and 33 are spaced apart and are connected by a spacer 40. A spacer 41 is connected between the fiber optic hydrophone segments 33 and 34, and a spacer 43 is connected between the fiber optic hydrophone segments 34 and 35. The fiber optic hydrophone 30 may include additional fiber optic hydrophone segments (not shown) that are essentially identical to the fiber optic hydrophone segments 32–35. Any additional hydrophone segments would be serially connected by spacers (not shown) that are essentially identical to the spacers 40–42. Rubber elbows 43 and crimping sleeves 44 may be installed at the ends of the spacers 40–42 to form flexible joints in the fiber optic hydrophone 30. The rubber elbows allow flexing between the segments while providing a relatively rigid path for the fibers traversing the flexible link, in contrast to the free floating fiber routing of the prior art.

Figure 2:
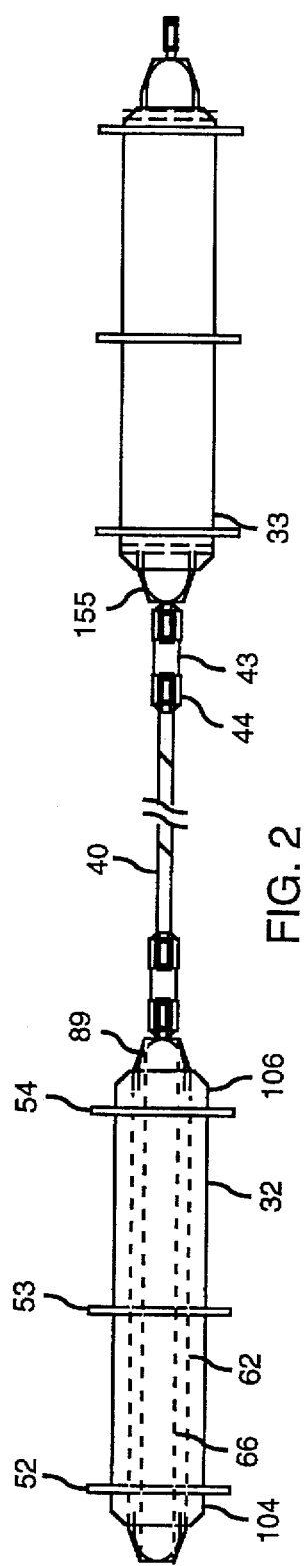
FIG. 2 illustrates a pair of hydrophone segments that may be included in the fiber optic hydrophone of FIG. 1 connected by a spacer.

As shown in FIGS. 2 and 3, portions of the fiber optic hydrophone segments 32 and 33 and the spacer 40 are shown in an expanded scale to illustrate structural features of the fiber optic hydrophone 30. As shown in FIGS. 2–6, the fiber optic hydrophone segment 32 includes an outer mandrel 50 that is preferably formed generally as a cylinder. The outer mandrel 50 has a pair of flanges 52 and 54 formed near its opposite ends and a center flange 53. An optical fiber 56 is wrapped around the outer mandrel 50 to form a first outer (or sensing) coil 58 of an interferometer 60. As further shown in FIGS. 2 and 3, an inner mandrel 62 is mounted inside the outer mandrel 50. The inner mandrel 62 preferably is formed as a hollow cylinder that encloses a cavity 64. A coupler housing 66, which also preferably is formed as a hollow cylinder, is mounted inside the cavity 64.

An optical fiber 70 is wrapped around the inner mandrel 62 to form a first inner coil 72 for the interferometer 60. In some embodiments of the invention, the inner coil 72 is isolated from the parameter being measured and functions as a reference coil in which the optical signals experience no phase shift. The optical fibers 56 and 70 have ends respectively, that extend into the coupler housing 66 to splices 74 and 76, respectively. Optical fibers 78 and 80, respectively, are connected between the splices 74 and 76 and an optical coupler 82. Optical signals are input to the fiber optic hydrophone 30 from an optical signal source 71 to an optical fiber 85, which guides the optical signals to the optical coupler 82. The optical coupler 82 divides the input optical signal into two signals that are input to the fibers 56 and 70.

The coupler housing 66 has an open end 87 arranged so that the optical fibers 56, 70 and 85 may pass from a region external to the cavity 64 to the splices 74 and 76 and the coupler 82, respectively. The other end 88 of the coupler housing is closed and is retained in position in the inner mandrel 62 by an end cap 89 that may be connected to an end of the inner mandrel 62 by any suitable means such as threads or an adhesive. The end cap 89 (interlink adapter) may be formed to either allow fluid to flood the interior cavity 64 of the inner mandrel 62 or to seal the interior cavity 64 to prevent the portion of the optical fiber inside the cavity 64 from being exposed to the acoustic pressure. The preferred embodiment of the fiber optic hydrophone 30 allows fluid inside the inner mandrel 62 to achieve the increased response. When the acoustic wave acts on both the outer mandrel 58 and the inner mandrel 62, the sensor operates in a push-pull mode and therefore has twice the response obtained when the cavity 64 is sealed.

As shown in FIG. 3, the open end 87 of the housing 66 is retained in position by an end cap 91 that includes an opening 95 arranged to allow for passage of the optical fibers 56, 70 and 85.

FIG. 4 is a simplified illustration of the basic structure of a fiber optic interferometer 60 that may be included in the fiber optic hydrophone 30. FIG. 4 shows only the mandrels, optical fibers optical couplers, optical signal source and signal processing apparatus used in forming the fiber optic interferometer 60. The preferred structures of the remainder of the fiber optic hydrophone 30 are shown in other Figures.

Optical signals from the optical signal source 71 are coupled into the fiber 56 and 70 and then propagate in the fibers 56 and 70 to the outer coil 58 and the inner coil 72 of the interferometer 60. The outer coil 58 is exposed to the parameter, typically an acoustic field, that is to be measured. An incident acoustic field interacts with the outer coil 58 to change the phase of optical signal guided by the outer coil 58. The inner coil 72 can be isolated from the parameter, or it can be made to respond to the parameter in an opposite sense from the response of the outer coil 58, so that the difference in phase of the optical signal in the outer coil 58 and the inner coil 72 is a measure of the intensity changes in the incident acoustic field.

The optical fibers 56 and 70 then guide the optical signals to the second hydrophone segment 33. The segment 33 includes an outer mandrel 50A and an inner mandrel 62A. The optical fibers 56 and 70 may pass through openings in the flanges on the inner and outer mandrels 50A and 62A in the manner shown in FIGS. 3, 5–8. Outer coil 90 and inner coil 92 are formed on the outer and inner mandrels 50A and 62A, respectively. The outer coil 90 can be exposed to the acoustic field while the outer coil 92 is isolated from the acoustic field or be made to respond oppositely. Changes in the acoustic field cause differences in the phase of optical signals in the outer coil 90.

The optical fibers 56 and 70 are used to form outer and inner coils on the outer and inner mandrels, respectively, of each hydrophone in the 30 in the manner shown in FIG. 4 and described above. The fiber optic hydrophone 30 may include a large number of outer and inner coils formed essentially identically to the coils 58 and 72. The outer coils do not all have to have the same number of turns. The number of turns in the inner coils also may vary. Varying the number of turns allows the hydrophone segments to have different weight in the resulting measurement.

The last hydrophone segment 35 in the fiber optic hydrophone 30 may be formed to be essentially identical to the first hydrophone segment 32. The hydrophone 35 includes an outer coil 94 and an inner coil 96. A fiber optic coupler 98 combines the optical signals guided by the optical fiber 56 and 70 and provides the fiber optic hydrophone output at an optical fiber 100. The combined optical signals contain interference fringe patterns that are indicative of the phase shift of the outer optical signals as they propagate through each coil. Signal processing apparatus 102 is then used to process the interference fringes so that the weighted average of the acoustic pressure over the locations of each of the hydrophone segments 32–35 may be determined. It is to be understood that the number of hydrophone segments in the fiber optic hydrophone 30 may vary from the number shown in the drawings and described herein. The four hydrophone segments 32–35 were selected only to illustrate the basic features of the invention.

As shown in FIGS. 2, 3, 5 and 6, a first small end portion 104 of the outer mandrel 50 extends beyond the end flange 53. A second small end portion 106 of the outer mandrel 50 extends beyond the end flange 54. The end portions 104 and 106 are essentially identical. Therefore, only the end portion 104 is shown in detail in FIG. 6 and described in detail herein.

Figure 5:
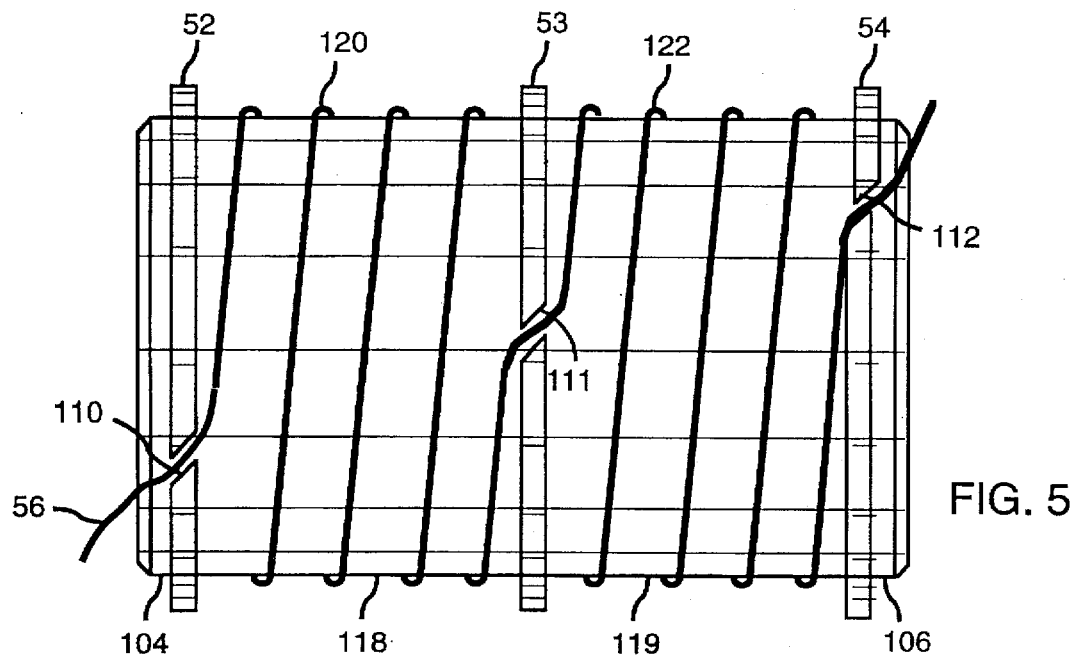
FIG. 5 is an elevation view of an outer mandrel that may be included in the hydrophone segment of FIGS. 1–3.

As shown in FIG. 5, the flanges 52–54 may have angled grooves 110–112, respectively therein. The angled grooves 110–112 form passages for the optical fiber 56 through the flanges 52–54, respectively. A few turns of the outer coil 58 are shown in FIG. 5 to illustrate passage of the optical fiber 56 through the angled grooves 110–112.

As shown in FIG. 3 and 5, the optical fiber 56 may be guided through the groove 110 in the flange 52 and wrapped around the left side 118 of the outer mandrel 50 to form a first outer coil portion 120. The optical fiber 56 is then passed through the groove 111 in the center flange 56 and wrapped around the right side 119 of the outer mandrel 50 to form a second outer coil portion 122. The optical fiber 56 then passes through the groove 112 in the end flange 53 and is directed to the spacer 40.

As shown in FIGS. 2, 3 and 6, a passage 116 is formed in the cylindrical wall of the outer mandrel 50 in the end portion 104. The passage 116 has dimensions appropriate for serving as a conduit through the cylindrical outer wall of the outer mandrel 50 for the optical fiber 70 (shown in FIG. 3) that is wrapped around the inner mandrel 62.

Figure 7:
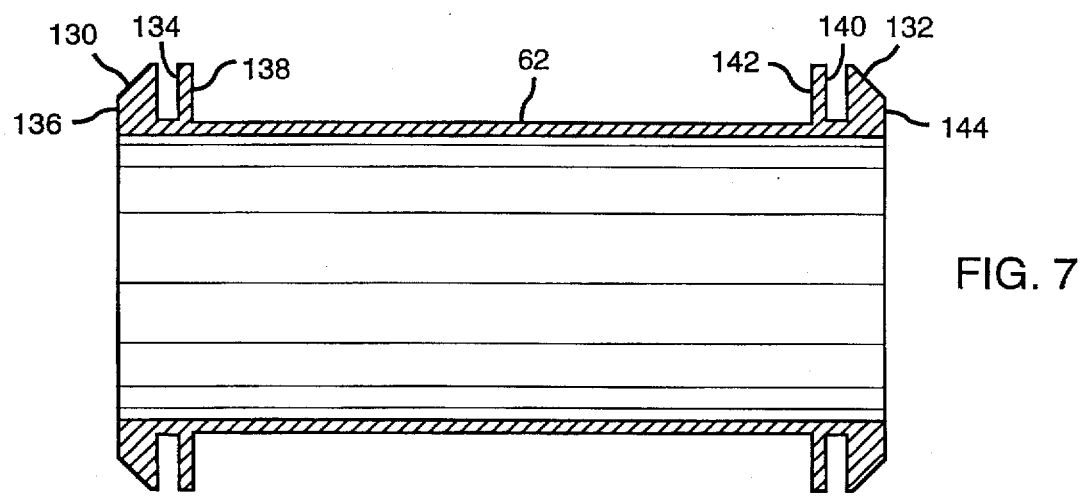
FIG. 7 is a cross-sectional view of the inner mandrel of FIG. 3.
Figure 8:
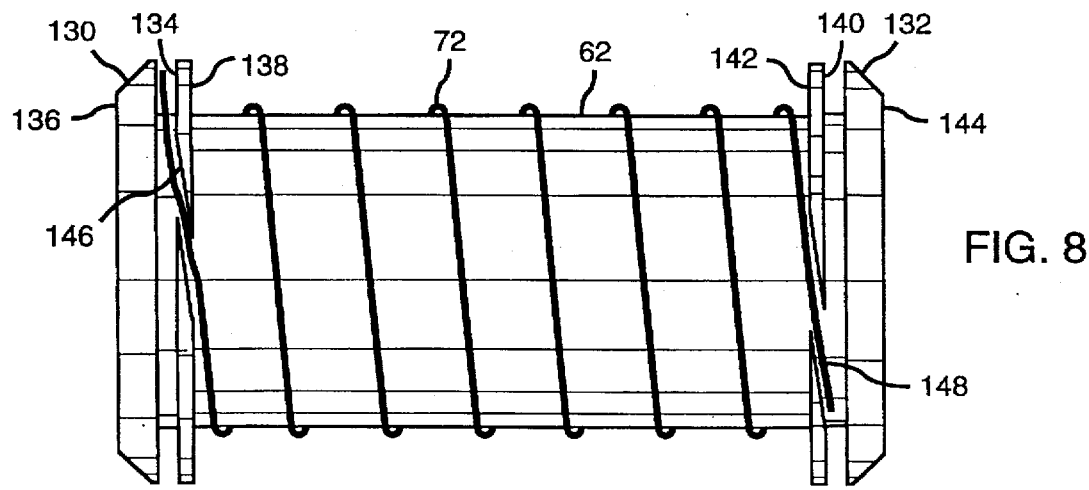
FIG. 8 is an elevation view of the inner mandrel of FIG. 7.

As shown in FIGS. 3, 7 and 8, the inner mandrel 62 has substantially identical end flanges 130 and 132. The end flange 130 has a circumferential groove 134 therein that is arranged to form flange portions 136 and 138. A second circumferential groove 140 is formed in the end flange 132 to form flange portions 142 and 144. The diameter of the flange portions 136 and 138 is substantially the same as the inner diameter of the hollow cylindrical outer mandrel 50 so that the end flanges 136 and 138 fit closely within the outer mandrel 50. An angled groove 146 is formed in the flange portion 138 of the end flange 130 and a similar angled groove 148 is formed in the flange portion 142 in the end flange 132. The optical fiber 70 is wrapped around the outside of the inner mandrel 62 between the end flanges 130 and 132. The optical fiber 70 passes through the angled groove 148 into the circumferential groove 140. The circumferential groove 134 is aligned with the passage 116 in the outer mandrel 50. The optical fiber 70 passes from the passage 116 into the circumferential groove 134 so that the optical fiber 56 is led to the inner mandrel 62. A passage 116A is formed in the other end of the inner mandrel 62 so that the optical fiber 70 may be passed through the passage 116A and directed to the spacer 40.

Figure 9:
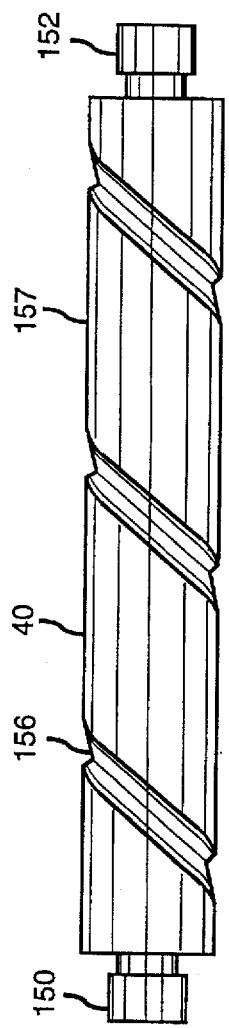
FIG. 9 is a side elevation view of a spacer that may be included in the apparatus of FIGS. 1 and 2.

FIG. 9 shows the spacer 40 in greater detail. The ends of the spacer 40 include splices 150 and 152 for attaching the spacer 40 to the end caps 89 and 155 of the hydrophone segments 32 and 33. The spacer 40 is used to construct non-sensing, "zero weighted" hydrophone segments. The spacer 40 includes a spiral groove 156 that routes the optical fibers 56 and 70 along the length of a rod 157. The rod 157 is rigid to minimize any influence of the acoustic field on the optical fibers 56 and 70. Both of the optical fibers 56 and 70 are exposed to the acoustic field along the length of the spacer 40 to further minimize any phase shift between signals guided by the fibers 56 and 70 in the region where the fibers are wrapped around the spacer rod. The spiral groove 156 routes the pair of fibers 56 and 70 in a manner that minimizes any acoustic response in this region.

Acoustically deadened areas are formed by routing both fibers 56 and 70 side by side on the spacer 40, which may be an aluminum rod. The fibers 56 and 70 are adhered to the spacer 40 with a suitable adhesive. Acceleration sensitivity can still arise due to motion of the fibers 56 and 70 that cross the flexible rubber joints 43. Acceleration sensitivity is minimized by adhering the two fibers to one another and routing across the spacer 40 in a one or two loop spiral. The fibers may be adhered to foam or some easily compressible support that may be placed over the rubber joint to minimize strain on the fibers as the joint bends.

FIGS. 10–13 show a second embodiment of the invention having an alternative technique for routing the inner fiber between successive sections of the fiber optic hydrophone 30. As shown in FIGS. 10 and 11, the fiber optic hydrophone 30 is assembled by winding the first outer coil 168 on an inner mandrel 170. The inner mandrel 170 has end flanges 172 and 174 that have radial slots 176 and 178, respectively. An optical fiber 180 is passed through the slot 176 and then wrapped around the inner mandrel 170. After the first outer coil is formed, the optical fiber 180 is then routed through the slot 178 and passed over an end cap 182. A few turns of the optical fiber 180 are placed on a spacer 184. A second inner mandrel 190 is connected to the spacer 184. The mandrel 190 has a flange 192 that includes a slot 194. The optical fiber 180 is routed through the slot 194 and then and wrapped around a the second inner mandrel 190 to form a second outer coil 196.

As shown in FIGS. 12 and 13, an outer mandrel 200 is passed over the inner mandrel 170. The outer mandrel 200 has end flanges 202 and 204 that have slots 206 and 208, respectively extending radially inward from their edges. An optical fiber 210 is routed through the slot 206 and then wrapped around the outer mandrel 200 to form a first outer coil 212. The optical fiber 210 is then routed through the slot 208 and passed over the end cap 182. The optical fiber 210 is wrapped around the spacer 184 and then directed to the next outer mandrel (not shown) in the fiber optic hydrophone 30. As shown in FIG. 13, after the outer mandrel 200 is mounted to the inner mandrel, the fiber 180 passes through a small opening 214. A suitable potting material preferably is used to form a plug 216 that seals the opening 214 to seal the space enclosed between the inner mandrel 170 and the outer mandrel 200. The optical fiber 210 is then directed to the next outer mandrel 218, which is mounted on the inner mandrel 190.

ADVANTAGES OF PRESENT INVENTION

The methods of fiber-optic hydrophone construction outlined herein allow single interferometers to span many meters, and still be deployed in a flexible hose. Broadband acoustic noise with low spatial coherence (for example, noise due to turbulent flow around a towed) can thus be averaged out of the sensor signal. The acoustic sensitivity of the extended sensor can be spatially weighted to achieve cancellation of more coherent noise sources, such as mechanical waves in the hardware.

The spatial weighting profiles and acoustic sensitivities can varied continuously over a broad range by controlling the distribution of turns of fiber in the coils, which allows many options in the implementations of these noise rejection techniques. It should be noted that the routing of the outer and inner fibers can even be interchanged at particular points in the sensor to achieve negative weighting of portions of the acoustic field. These sensors have acoustic sensitivities covering a range of about 40 dB.

The fiber optic hydrophone structures described herein provide improved acceleration sensitivity compared to prior art. This invention emphasizes simplicity and low cost, which allows segmented hydrophones to be built more economically than before.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. A spatially weighted, extended fiber optic sensor for measuring changes in a physical parameter, comprising:

a first optical fiber having a plurality of spatially separated outer coils formed therein;

a second optical fiber having a plurality of spatially separated inner coils formed therein, the inner and outer coils being arranged in concentric pairs to form a plurality of serially connected sensor segments arranged such that there is a first sensor segment and a last sensor segment;

a plurality of spacers arranged such that one of the plurality of spacers is between successive sensor segments, each spacer being formed to comprise a rod having a spiral groove along the length thereof, the first and second optical fibers being mounted in the spiral groove, the spacers being formed to guide the first and second optical fibers between successive sensor segments such that changes in the physical parameter between the sensor segments produce no phase difference between optical signals guided by the first and second fibers;

a first optical coupling apparatus arranged for coupling optical signals into the first and second optical fibers, the inner and outer coils being arranged for exposure to the parameter such that changes in the parameter at each sensor segment produce corresponding phase changes between the optical signals in the outer coils and the corresponding inner coils; and a second optical coupling apparatus arranged to combine signals in the first and second optical fibers after exposure of the sensor segments to the parameter.

2. The fiber optic sensor of claim 1, wherein each inner coil is inside its corresponding outer coil such that there is a sealed void therebetween.

3. The fiber optic sensor of claim 1 further including a flexible joint mounted between each spacer and sensor segments adjacent thereto.

4. The fiber optic sensor of claim 1, wherein each sensor segment further comprises:

an inner mandrel formed as a thin-walled hollow cylinder;

a first pair of end flanges formed on the inner mandrel, each end flange having a slot therein, the inner fiber being arranged to pass through the slots and wrap around the inner mandrel to form the outer coil between the first pair of end flanges;

an outer mandrel formed as a hollow cylinder and arranged to be concentric with the inner mandrel, the outer coil being formed on the outer mandrel, the inner and outer mandrels being formed to enclose a void where the outer coil is formed.

5. The fiber optic sensor of claim 4, further including a second pair of end flanges formed on the outer mandrel with the outer coil being formed between the second pair of end flanges.

6. A spatially weighted, extended fiber optic sensor for measuring changes in a physical parameter, comprising:

a first optical fiber having a plurality of spatially separated outer coils formed therein;

a second optical fiber having a plurality of spatially separated inner coils formed therein, the inner and outer coils being arranged in concentric pairs to form a plurality of serially connected sensor segments arranged such that there is a first sensor segment and a last sensor segment;

a plurality of spacers arranged such that one of the plurality of spacers is between successive sensor segments, the spacers being formed to guide the first and second optical fibers between successive sensor segments such that changes in the physical parameter between the sensor segments produce no phase difference between optical signals guided by the first and second fibers;

a first optical coupling apparatus arranged for coupling optical signals into the first and second optical fibers, the inner and outer coils being arranged for exposure to the parameter such that changes in the parameter at each sensor segment produce corresponding phase changes between the optical signals in the outer coils and the corresponding inner coils; and a second optical coupling apparatus arranged to combine signals in the first and second optical fibers after exposure of the sensor segments to the parameter.

an inner mandrel formed as a thin-walled hollow cylinder;

a first pair of end flanges formed on the inner mandrel, each end flange having a slot therein, the inner fiber being arranged to pass through the slots and wrap around the inner mandrel to form the outer coil between the first pair of end flanges;

an outer mandrel formed as a hollow cylinder and arranged to be concentric with the inner mandrel, the outer coil being formed on the outer mandrel, the inner and outer mandrels being formed to enclose a void where the outer coil is formed, further including a radial passage formed in the outer mandrel to allow passage of the second fiber through the wall of the outer mandrel; and a second pair of end flanges formed on the outer mandrel with the outer coil being formed between the second pair of end flanges.

7. A spatially weighted, extended fiber optic sensor for measuring changes in a physical parameter, comprising:

a plurality of spatially separated outer mandrels formed generally as thin-walled hollow cylinders;

a first optical fiber arranged to form an outer coil on each of the plurality of outer mandrels;

a plurality of inner mandrels arranged such that one of the outer mandrels is mounted concentrically inside a corresponding one of the outer mandrels, each of the plurality of inner mandrels being formed generally as a hollow, thin-walled cylinder including a first pair of end flanges with each end flange including a slot therein;

a second optical fiber passing through the slots in the end flanges of the inner mandrels and arranged to form an inner coil on each inner mandrel, with the inner mandrels, the inner coils, the outer mandrels and the outer coils being arranged so that they cooperate to form a plurality of serially connected sensor segments such that there is a first sensor segment and a last sensor segment;

a plurality of spacers arranged such that one of the plurality of spacers is between successive sensor segments, each spacer comprising a rod having a spiral groove along the length thereof, the outer and inner optical fibers being mounted in the spiral groove, the spacers being formed to guide the first and second optical fibers between successive sensor segments such that changes in the physical parameter between the sensor segments produce no phase difference between optical signals guided by the first and second fibers;

a first optical coupling apparatus arranged for coupling optical signals into the first and second optical fibers, the outer coils being arranged for exposure to the parameter such that changes in the parameter at each sensor segment produce phase changes between the optical signals in the outer coils and the corresponding inner coils; and a second optical coupling apparatus arranged to combine signals in the outer and inner optical fibers after exposure of the sensor segments to the parameter.

8. The fiber optic sensor of claim 7 further including a flexible joint mounted between each spacer and the adjacent sensor segment.

9. The fiber optic sensor of claim 7, further including a second pair of end flanges formed on the outer mandrel with the outer coil being formed between the second pair of end flanges.

10. The fiber optic coupler of claim 7 wherein the first optical coupling apparatus is positioned inside the inner mandrel of the first sensor segment and the second optical coupling apparatus is positioned inside the inner mandrel of the last sensor segment.

11. The fiber optic coupler of claim 6, wherein the first optical coupling apparatus is positioned inside the inner mandrel of the first sensor segment and the second optical coupling apparatus is positioned inside the inner mandrel of the last sensor segment.

* * * * *